United States Patent

Kaneshima

Patent Number: 5,883,355
Date of Patent: Mar. 16, 1999

[54] METHOD OF ADJUSTING A CLAMPING FORCE OF SERVO-CONTROLLED WELDING GUN

[75] Inventor: Satoshi Kaneshima, Toyama, Japan

[73] Assignee: Nachi-Fujikoshi Corporation, Toyama, Japan

[21] Appl. No.: 878,067

[22] Filed: Jun. 18, 1997

[30] Foreign Application Priority Data

Jun. 27, 1996 [JP] Japan .................................. 8-185349

[51] Int. Cl.$^6$ ................................................. B23K 11/11
[52] U.S. Cl. ...................... 219/86.51; 219/91.1; 219/91.2
[58] Field of Search ............................... 219/86.1, 86.23, 219/86.25, 86.33, 86.41, 86.51, 91.1, 91.2

[56] References Cited

U.S. PATENT DOCUMENTS

| | | | |
|---|---|---|---|
| 4,408,114 | 10/1983 | Nakata et al. | 219/110 |
| 4,680,441 | 7/1987 | McKendrick | 219/91.1 |
| 5,138,127 | 8/1992 | Fries et al. | 219/86.51 |
| 5,321,225 | 6/1994 | Boyer | 219/89 |
| 5,582,747 | 12/1996 | Sakai et al. | 219/86.41 |
| 5,652,488 | 7/1997 | Rennau | 219/86.51 X |

FOREIGN PATENT DOCUMENTS

| | | |
|---|---|---|
| 62-286688 | 12/1987 | Japan . |
| 4-253575 | 9/1992 | Japan . |
| 4-284981 | 10/1992 | Japan . |
| 6-312273 | 11/1994 | Japan . |

*Primary Examiner*—Gregory L. Mills
*Attorney, Agent, or Firm*—Venable; Robert J. Frank

[57] ABSTRACT

A method of adjusting a clamping force for automatically correcting a reference clamping force(Fi) vs. electric reference supply current(Ii) table for a servo-controlled welding gun on which a workpiece is clamped. The clamping force vs. electric current table is generated based on servo motor and welding gun design specifications, and stored in memory. A proportional coefficient(k) between the supply currents(Ii) and the clamping forces(Fi) is calculated from this table. Each reference supply current(Ii) in the table is actually supplied to the servo motor to measure an actual clamping force(fi). The actual clamping force(fi) is compared with the corresponding reference clamping force(Fi) for each reference supply current(Ii) in the table. If the absolute value of a difference between the actual and reference clamping forces(|Fi-fi|) is outside a predetermined allowance, the reference supply current(Ii) is corrected by adding to the reference supply current(Ii) an amount obtained by multiplying a difference (Fi-fi) by the proportional coefficient(k), namely (k*(Fi-fi)). The actual clamping force(fi) is measured again with the corrected reference supply current. This operation is repeated until the absolute value of the difference falls within the allowance, at which time the value of the reference supply current in the table is corrected.

5 Claims, 2 Drawing Sheets

METHOD OF ADJUSTING A CLAMPING FORCE OF SERVO-CONTROLLED WELDING GUN

BACKGROUND OF THE INVENTION

1. Field of the Invention

The present invention relates to a method of adjusting a clamping force in a servo-controlled welding gun adapted to perform a desired welding operation on a workpiece held in a clamped manner on the electric resistance spot welding gun controlled by a servo motor.

2. Description of Related Art

In a known electric resistance spot welding gun, a workpiece is clamped between one electrode (a movable or upper electrode) driven by an air cylinder or a servo motor for example and the other electrode (a static or lower electrode) and a large current is passed between these electrodes for a desired welding work. If, as disclosed in U.S. Pat. No. 5,321,225, a servo motor is used for the driving source to operate the movable electrode, the clamping force applied to the welding point of a workpiece held between the movable and static electrodes is generally dependent on a current supplied to the servo motor. Therefore, calculating beforehand supply currents to the servo motor necessary for generating a plurality of clamping forces and storing the calculated clamping forces and supply currents as a clamping force vs. electric current table in the welding gun controller. A desired clamping force at a welding operation is provided by selecting a supply current to the servo motor corresponding to a specified clamping force.

Generally, the clamping force vs. electric current table can be theoretically obtained based on various electrical and mechanical data of the servo motor and welding gun. However, since the relationship between the obtained clamping forces and electric currents are of theoretical, it becomes somewhat different from the relationship at an actual clamping operation. This difference or error is caused by an error in fabrication of the servo motor and the welding gun, an error due to a dynamic element caused by an actual clamping operation caused by friction and rigidity of movable sections, and an error due to aging, or abnormal condition caused by time, of the apparatus for example. Therefore, it is necessary, before performing a welding operation, to actually clamping a workpiece between the electrodes of the welding gun, measure the clamping force at this moment with a clamping force measurer or the like, and correct the supply current to the servo motor such that the specified clamping force is obtained.

To correct the errors due to the fabrication and the dynamic element, the servo motor is driven by any one of the supply currents (reference supply currents) listed in the clamping force vs. electric current table obtained from the design data, a pressure detector is clamped between the electrodes of the welding gun, visually read a clamping force value (an actual clamping force) indicated on the clamping force measurer connected to the pressure detector, and, if the actual clamping force is found different from the clamping force value (the reference clamping force) corresponding to the reference supply current selected this time, to be more specific, if the actually measured clamping force is outside the allowance of the reference clamping force, the reference supply current selected this time is corrected by altering the input data by the operator, and the actual clamping force is measured again. By repeating these operations, the actual supply current to the servo motor corresponding to the reference clamping force is obtained. Then, the above-mentioned operations are repeated for all reference supply currents listed in the clamping force vs. electric current table, thereby correcting the clamping force vs. electric current table theoretically obtained from the design data.

To correct the error due to apparatus aging, the same corrective operations as those for the correction of the error due to the fabrication are performed to check if the clamping force listed in the clamping force vs. electric current table is actually applied. The clamping force vs. electric current table is corrected accordingly. If the clamping force value is found significantly different from that at installation of the welding gun, it may be determined that the system including the servo motor and the welding gun is failing.

However, the above-mentioned method of correcting the clamping force vs. electric current table heavily depends on the visual check and manual operation of the operator, requiring many corrective steps and therefore a lot of labor when the clamping force vs. electric current table is corrected for all welding guns. Especially, if the correction of the error due to apparatus aging is to be performed every day at starting the session of the day along with other operational checkout, the operator must bear massive amounts of load and the number of steps. Also, the conventional corrective operation by the operator cannot cope with the recent labor saving trend in fabrication process, especially unattended production.

SUMMARY OF THE INVENTION

It is therefore an object of the present invention to provide a method of adjusting a clamping force of a servo-controlled welding gun wherein errors in a clamping force vs. electric current table caused in fabrication of the welding gun and errors due to dynamic factors can be corrected automatically without requiring manual intervention by an operator.

In carrying out the invention and according to one aspect thereof, there is provided a servo-controlled welding gun clamping force adjusting method for performing a desired welding operation by holding a workpiece in a clamped manner between a movable or upper electrode of an electric resistance spot welding gun and a static or lower electrode of the same by moving the movable or upper electrode by a servo motor. In this method, a clamping force vs. electric current table obtained from design data is stored in a controller for the servo motor and the welding gun. Errors caused in fabrication of the welding gun and errors due to dynamic factors can be eliminated by the following procedure. A proportional coefficient(k) between the plurality of reference supply currents(Ii) to a servo motor and the plurality of reference clamping forces(Fi) from this clamping force vs. electric current table is calculated. Each reference supply current(Ii) in the table is actually supplied to the servo motor to measure an actual clamping force(fi). The actual clamping force(fi) is compared with the corresponding reference clamping force(Fi) for each reference supply current(Ii) in the clamping force vs. electric current table. If the absolute value of a difference between the actual and reference clamping forces(|Fi-fi |) is found outside a predetermined allowance, the reference supply current(Ii) is corrected by adding to the reference supply current(Ii) an amount obtained by multiplying a difference (Fi-fi) by the proportional coefficient(k), namely (k*(Fi-fi)). The actual clamping force(fi) is measured again with a corrected reference supply current. This operation is repeated until the absolute value of the difference( |Fi—fi|) falls within the allowance. When the absolute value of the difference falls within the allowance, the value of the reference supply current to the servo motor in the clamping force vs. electric current table for servo-controlled welding gun is corrected.

In the novel method, the reference supply current to the servo motor corresponding to the reference clamping force for an actual welding operation can be calculated automatically, thereby automatizing the correction of the clamping force vs. electric current table in a short time without requiring a manual operation. The novel method eventually provides a labor-saving or unattended operation of the servo-controlled welding gun.

The above and other objects, features and advantages of the present invention will become more apparent from the accompanying drawings, in which like reference numerals are used to identify the same or similar parts in several views.

DETAILED DESCRIPTION OF THE PREFERRED EMBODIMENTS

Figure 2A:
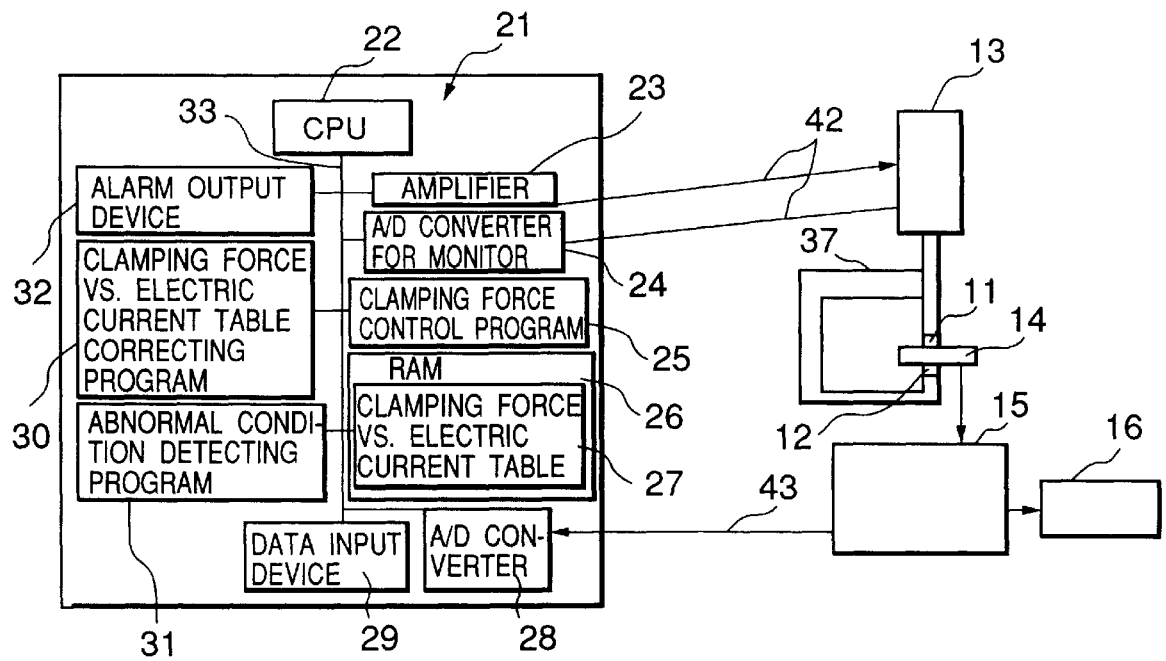
FIG. 2a is a general block diagram illustrating a system including a welding gun and servo controller thereof to which the embodiment of FIG. 1 is applied.
Figure 2B:
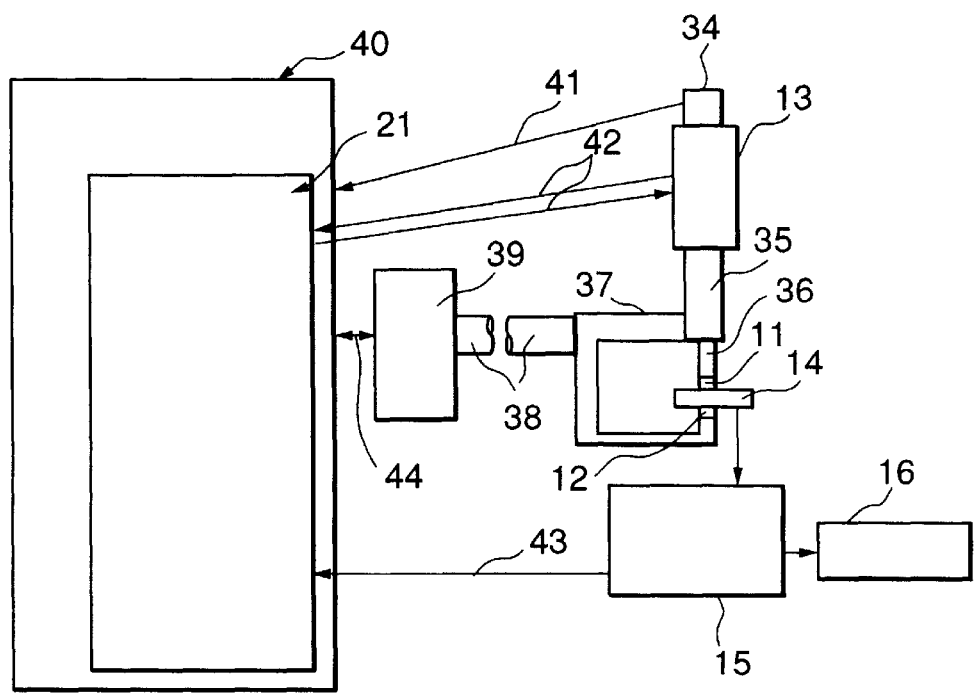
FIG. 2b is a general block diagram illustrating a system including an electric resistance spot welding gun servo controller different from that of FIG. 2a and an industrial robot controller, the welding gun and a servo motor are of the same known construction as those of FIG. 2a, however illustrated in more detail.

This invention will be described in further detail by way of example with reference to the accompanying drawings. FIG. 2a is a general block diagram illustrating a system including a welding gun and a controller for controlling the same to which a method of adjusting the clamping force of a servo-controlled welding gun practiced as one preferred embodiment of the present invention is applied. For the convenience of description, as shown in FIG. 2b illustrating a known welding gun 37 and a servo motor 13 of FIG. 2a in detail, an arm 36 is attached at the tip thereof with a movable or lower electrode 11, which is one of two electrodes of the welding gun 37, the arm 36 being driven by the servo motor 13. By moving the movable or upper electrode 11 by driving the servo motor 13, a workpiece 14 is held in a clamped manner between the movable or upper electrode 11 and a static or lower electrode 12, which is the other electrode of the welding gun arranged opposite to the movable or upper electrode 11. In this state, a large current for welding is made flow between the movable or upper electrode 11 and the static or lower electrode 12 through the workpiece 14 from a welding power supply, not shown, thereby performing a desired welding operation on the workpiece 14. Reference numeral 34 denotes a position detector for detecting the rotation of the servo motor 13. Reference numeral 35 denotes a converter for converting the rotational movement of the servo motor 13 into the linear movement of the arm 36.

In welding operation, the reference numeral 14 is a workpiece. In correcting a clamping force vs. electric current table to be described later, the workpiece 14 is preferably replaced by a pressure detector for detecting a clamping force applied by the electrodes. An actual clamping force is measured by a clamping force measurer 15 connected to the pressure detector 14. Thus, the welding gun is only operated such that the pressure detector, instead of the workpiece, is held between the electrodes in a clamped manner, facilitating clamping force measurement. Preferably, a monitor device 16 may also be connected to the clamping force measurer 15 as shown in FIG. 2a, so that the operator can check clamping force values on the monitor device 16. Alternatively, instead of only the pressure detector, the workpiece and the pressure detector may be held together in a clamped manner between the movable or upper electrode 11 and the static or lower electrode 12.

Reference numeral 21 denotes a servo-control unit of an electric resistance spot welding gun for controlling the operation of the same. A clamping force value obtained by the clamping force measurer 15 is outputted as an analog voltage signal to an A/D converter 28 in the electric resistance spot welding gun servo-control unit 21 via a line 43. The inputted analog voltage signal is converted to a digital signal. Then, based on this digital signal, an arithmetic operation is performed by a CPU 22 using a clamping force vs. electric current table correcting program 30 for correcting the servo motor supply current data in the clamping force vs. electric current table 27 stored in a RAM 26. A clamping pressure vs. electric current table 27 in the RAM 26 is corrected by reference supply currents obtained by this arithmetic operation. A data input device 29 is used for entering various pieces of data necessary for controlling the welding gun. The data input device includes, for example, a keyboard from which the data is entered manually and an interface device for transferring the data with the keyboard and external devices. Preferably, the design specifications of the servo motor and the welding gun are entered from the data input device 29. And, based on the entered design specifications of the servo motor and the welding gun, the clamping pressure vs. electric current table 27 may be automatically generated by use of a clamping pressure vs. electric current table generating program, not shown, stored in the RAM 26 beforehand for generating the clamping pressure vs. electric current table 27 to be stored in the RAM 26.

A clamping force control program 25 contains a program for controlling the servo motor and the welding gun. An amplifier 23 outputs an operation signal to the servo motor 13 as instructed by the clamping control program 25. An A/D converter 24 monitors the supply current value being supplied to the servo motor 13 and converts a monitored value to a digital signal to obtain the data for correcting the clamping force vs. electric current table. It should be noted that, if the clamping force measurer 15 is adapted to output a digital voltage signal, the A/D converter 28 is not required. Reference numeral 33 denotes a cable such as a bus cable for signal transmission.

Figure 1:
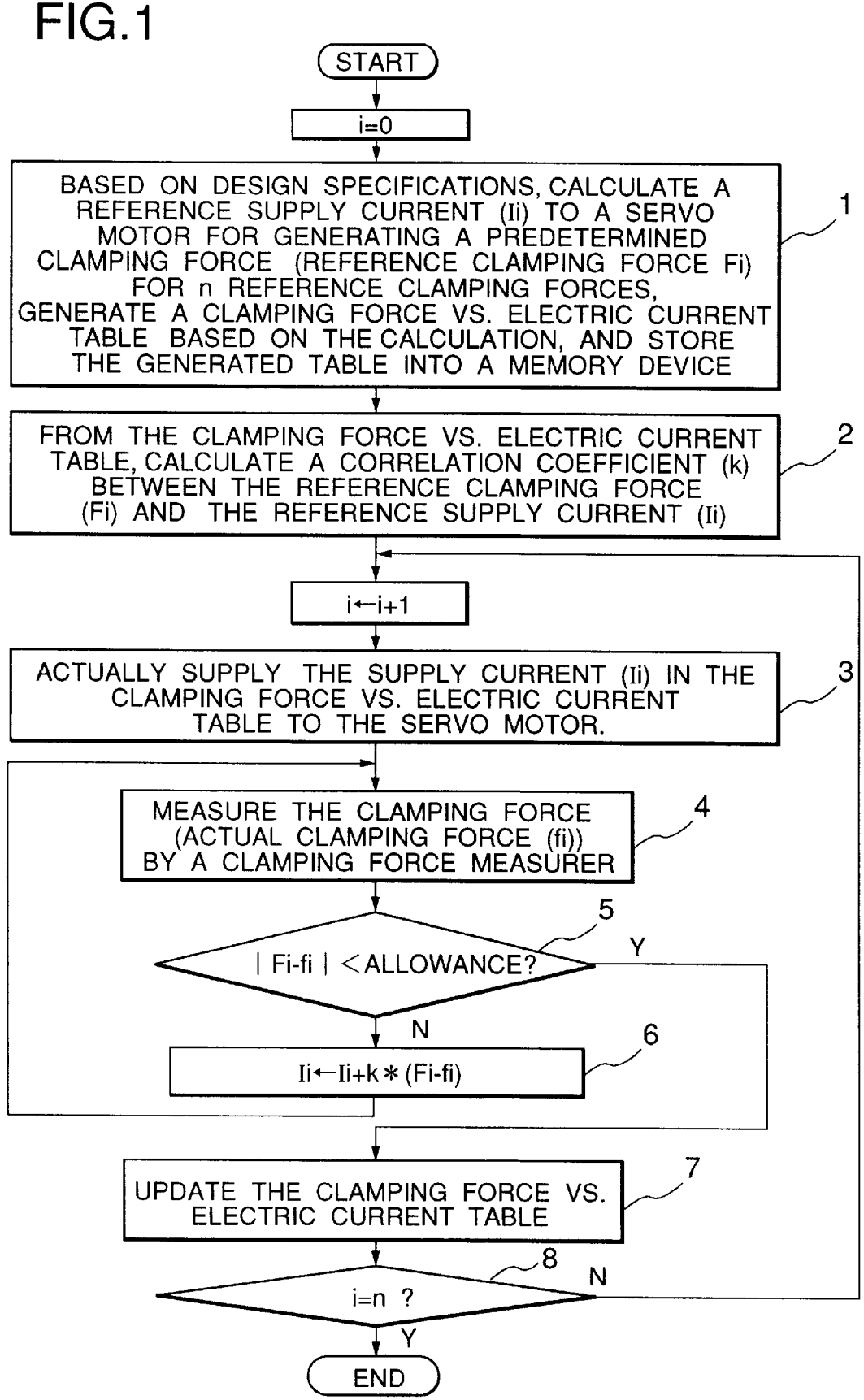
FIG. 1 is a flowchart illustrating a servo controlled welding gun clamping force adjusting method practiced as one preferred embodiment of the present invention by way of nonlimiting example.

The following describes a method of correcting the clamping force vs. electric current table for the servo-controlled welding gun according to the present invention by using the method of adjusting a clamping force of a servo-controlled welding gun practiced as one preferred embodiment of the present invention by way of nonlimiting example with reference to the flowchart of FIG. 1.

Step 1

Based on the design specifications of the servo motor 13 and the welding gun entered from the data input device 29, a supply current (reference supply current (Ii)) to the servo motor 13 for causing the welding gun to generate a predetermined clamping force as a reference clamping force (Fi) is calculated for the plural number (n) of reference clamping forces (Fi) in advance. It should be noted that the subscript i denotes one of the numbers 1 to n. The plurality of reference clamping forces (Fi) and the corresponding reference supply currents (Ii) are stored in the clamping force vs. electric current table 27 held in the RAM 26. The plurality of reference clamping forces (Fi) are generally selected based on the working specifications to be used when performing a welding operation on the workpiece 14. This selection may also be made by setting an upper limit value, a lower limit value, and the number of clamping forces (n), the interval between the upper and lower values being divided equidistantly. One example of the clamping force vs. electric current table used in the present embodiment is shown below:

| Reference clamping force | Reference supply current |
|---|---|
| F1 | I1 |
| F2 | I2 |
| ... | ... |
| Fk | Ik |
| ... | ... |
| Fn | In |

Step 2

From the plural pieces of data of the reference supply currents (Ii) and reference clamping forces (Fi) stored in the clamping force vs. electric current table 27, a proportional coefficient (k) which is a coefficient of the correlation between the reference supply currents and the reference clamping forces is calculated. Generally, since the clamping force of the welding gun driven by the servo motor is proportional to the supply current to the servo motor, the correlated coefficient between the reference supply current (Ii) and the reference clamping force (Fi), namely the proportional coefficient (k) can be obtained from the plurality of data of the plurality of reference supply currents and the plurality of reference clamping forces stored in the clamping force vs. electric current table obtained in step 1. The obtained proportional coefficient (k) is used for calculating a supply current correction amount to be described later.

Step 3

For each of the n reference supply currents (Ii) stored in the clamping force vs. electric current table 27 obtained in step 1, a current is actually supplied to the servo motor 13. The following describes a flow of the processing to be performed when the first reference supply current (I1) is supplied to the servo motor 13.

Step 4

A clamping force at the time when the reference supply current (I1) is supplied to the servo motor 13, namely an actual clamping force (f1), is measured by the clamping force measurer 15. Referring to FIG. 2a, the pressure detector 14 is held between both the electrodes 11 and 12 of the welding gun in a clamped manner for measurement of the actual clamping force (f1), the pressure detector 14 being connected to the clamping force measurer 15. Thus, the clamping force can be measured with ease only by holding the pressure detector instead of a workpiece between both the electrodes 11 and 12 of the welding gun in a clamped manner and operating the servo motor 13 in this state.

Step 5

Comparison is made between the reference clamping force (F1) and the actual clamping force (f1) for the supply current (I1) to the servo motor 13 stored in the clamping force vs. electric current table 27. If the absolute value of a difference between the reference clamping force (F1) and the actual clamping force (f1), namely |F1-f1|, is greater than a predetermined allowance, it is determined that the reference clamping force (F1) stored in the clamping force vs. electric current table 27 is not equal to the actual clamping force (f1), namely not equal to the clamping force at the time when the supply current (I1) was actually supplied to the servo motor 13. Then, a correcting operation in the next step 6 is performed. On the other hand, if the absolute value of the difference between the reference clamping force (F1) and the actual clamping force (f1), namely |F1-f1|, is smaller than the predetermined allowance, it is determined that the actual clamping force (f1) is equal to the reference clamping force (F1), namely the reference supply current (I1) stored in the clamping force vs. electric current table 27 is an appropriate value. In this case, the process goes to step 7 and the clamping force vs. electric current table 27 is updated and the process further goes to step 8 for the processing to be performed when the second reference supply current (I2) is supplied to the servo motor 13. In the former mentioned case, the value of the reference supply current (I1) stored in the clamping force vs. electric current table 27 is not updated.

Step 6

In the comparison performed in step 5, if the absolute value of the difference between the reference clamping force (F1) and the actual clamping force (f1), |F1-f1|, is found greater than the predetermined allowance, the supply current to the servo motor 13 is corrected by adding to the reference supply current(Ii) an amount obtained by multiplying a difference (F1-f1) by the proportional coefficient (k), namely (k*(F1-f1)). Then, the actual clamping force (f1) is measured again with the corrected reference supply current value( Ii+k*(F1—f1)). This operation is repeated until the absolute value of the difference |F1-f1| falls within the predetermined allowance.

Step 7

When the absolute value of the difference between the reference clamping force (F1) and the actual clamping force (f1), namely |F1-f1|, falls within the predetermined allowance, the value of the reference supply current (I1) to the servo motor 13 stored in the clamping force vs. electric current table 27 is updated to the value obtained by the correction.

Step 8

The above-mentioned processing is likewise performed on the second and subsequent reference supply current correcting operations. When the correction for the nth reference supply current (In) has been completed, the correction of the clamping force vs. electric current table 27 comes to an end.

It should be note that, in the above-mentioned clamping force vs. electric current table, the supply current to the servo motor 13 at the time when the clamping force is applied at an intermediate clamping force value is obtained, for example, from a supply current interpolated value obtained by performing least squares method calculation on the clamping force vs. electric current table 27.

Referring to FIG. 2b showing a general block diagram of a system including a welding gun having a welding gun controller different from that of FIG. 2a and an industrial robot controller, the welding gun of FIG. 2a is mounted on the tip of an upper arm 38 of an industrial robot 39 and the electric resistance spot welding gun servo-control unit 21 of FIG. 2a is integrated in the housing of an industrial robot controller 40 in a manner as disclosed in U.S. Pat. No. 5,321,225. The supply current value to the servo motor for correcting the clamping force vs. electric current table is adjusted not by the electric resistance spot welding gun servo-control unit 21 but by the industrial robot controller 40, the movement of a movable or upper electrode 11 by a servo motor 13 being provided as though a movement of an additional axis of the industrial robot 39. The movement of the movable or upper electrode 11 by the servo motor 13 is detected by a position detector 34, the detection being fed back to the industrial robot controller 40 via a line 41 as the movement of the additional axis of the industrial robot 39. This constitution, when using a servo-controlled welding gun in in industrial robot, allows the controller to be shared by the welding gun and the robot main and the control program and control data to be also shared by the welding gun and the robot main, finding a ready application in a welding robot for use in manufacture of automobile bodies.

To correct aging or an abnormal condition caused by time, the pressure detector is put between the movable or upper electrode 11 and the static or lower electrode 12 in a clamped manner instead of the workpiece 14 at an empirically appropriate interval, once a week for example, and an abnormal condition detecting program 31 shown in FIG. 2a is executed in this state. For example, the following describes a case in which the kth reference clamping force Fk in the clamping force vs. electric current table preset by the above-mentioned servo-controlled welding gun clamping force adjusting method is checked for abnormalcy caused by time. The reference supply current Ik to the servo motor corresponding to reference clamping force Fk is selected. The selected reference supply current Ik is supplied to the servo motor 13 to clamp the pressure detector 14. An actual supply current ik to the servo motor at this moment is detected and the detected supply current is entered in the electric resistance spot welding gun servo-control unit 21. At the same time, an actual clamping force fk measured by the clamping force measurer 15 is entered in the electric resistance spot welding gun servo-control unit 21. Then, the reference clamping force Fk is compared with the actual clamping force fk. If the absolute value of a difference |Fk—fk| is found within a predetermined allowance, it is determined that the clamping is being made at a normal clamping force. However, if the absolute value of the difference |Fk—fk1| is found outside the predetermined allowance, it is determined that some abnormal condition has taken place. In the latter case, if the actual supply current ik to the servo motor 13 is equal to the supply current Ik in the clamping force vs. electric current table, it indicates that the servo motor 13 or the welding gun is failing. If the actual supply current ik is not equal to the supply current Ik, it indicates that the electric resistance spot welding gun servo-control unit 21 or the servo motor 13 is failing. Further, an abnormal signal is outputted from an alarm output device 32 in the controller or a detected abnormal condition is displayed on the monitor device 16 according to the type of the detected abnormal condition. The operator can run this abnormal condition detecting program 31 to automatically check for an abnormal clamping force.

While the invention has been described with reference to preferred embodiments thereof, it is to be understood that modifications or variations may be easily made without departing from the scope of the present invention which is defined by the appended claims.

What is claimed is:

1. A method of adjusting a servo-controlled welding gun clamping force for performing a desired welding operation on a workpiece held in a clamped manner between a pair of electrodes namely a movable or upper electrode of an electric resistance spot welding gun and another electrode namely a static or lower electrode of said electric resistance spot welding gun by moving said movable or upper electrode by a servo motor, comprising the steps of:

calculating, for each of a plurality of reference clamping forces (Fi), a reference supply current (Ii) to said servo motor for causing said electric resistance spot welding gun to generate a predetermined clamping force as the reference clamping force (Fi) based on design specifications of said servo motor and said electric resistance spot welding gun;

storing said plurality of reference clamping forces (Fi) and the corresponding reference supply currents (Ii) to said servo motor into a clamping force vs. electric current table held in a memory device in a servo-control unit of said electric resistance spot welding gun;

calculating a proportional coefficient (k), which is a correlation coefficient between said plurality of reference supply currents (Ii) and said plurality of reference clamping forces (Fi), from a plurality of data of said plurality of reference supply currents and said plurality of reference clamping forces stored in said clamping force vs. electric current table;

measuring, by a clamping force measurer, an actual clamping force (fi) as a clamping force obtained when each of said plurality of reference supply currents (Ii) stored in said clamping force vs. electric current table is actually supplied to said servo motor;

comparing sequentially said actual clamping force (fi) with said reference clamping force (Fi) for each of said plurality of reference supply currents (Ii) to said servo motor stored in said clamping force vs. electric current table; and if the absolute value of a difference between said reference clamping force (Fi) and said actual clamping force (fi), namely |Fi-fi|, is found outside a predetermined allowance, correcting the reference supply current to said servo motor by adding to the reference supply current(Ii) an amount obtained by multiplying a difference (Fi-fi) by said proportional coefficient (k), namely (k*(Fi-fi)), measuring an actual clamping force (fi) again by said claming force measurer, repeating the operation until said absolute value of the difference |Fi-fi| falls within said predetermined allowance, and, when said absolute value of the difference |Fi-fi| falls within said predetermined allowance, replacing a value of said reference supply current (Ii) to said servo motor with a value obtained after the correction;

wherein said reference supply current to said servo motor for causing said electric resistance spot welding gun to generate said predetermined clamping force is adjusted.

2. The method of adjusting a servo-controlled welding gun clamping force as claimed in claim 1, wherein said actual clamping force (fi) is measured by holding a pressure detector in a clamped manner between said movable or upper electrode and said static or lower electrode of said electric resistance spot welding gun instead of said workpiece, said pressure detector being connected to said clamping force measurer.

3. The method of adjusting a servo-controlled welding gun clamping force as claimed in claim 2, wherein said electric resistance spot welding gun is mounted on the tip of an arm of an industrial robot, said servo-control unit of said electric resistance spot welding gun is integrated inside a controller of said industrial robot, and said reference supply current to said servo motor for correcting said clamping force vs. electric current table is adjusted by said controller of said industrial robot with a movement of said movable or upper electrode by said servo motor provided as though a movement of an additional axis of said industrial robot.

4. The method of adjusting a servo-controlled welding gun clamping force as claimed in claim 1, wherein said electric resistance spot welding gun is mounted on the tip of an arm of an industrial robot, said servo-control unit of said electric resistance spot welding gun is integrated inside a controller of said industrial robot, and said reference supply current to said servo motor for correcting said clamping force vs. electric current table is adjusted by said controller of said industrial robot with a movement of said movable or upper electrode by said servo motor provided as though a movement of an additional axis of said industrial robot.

5. The method of adjusting a servo-controlled welding gun clamping force as claimed in claim 1, wherein, at a predetermined interval for checking for an abnormal condition caused by time, a pressure detector instead of said workpiece is held in clamped manner between said movable or upper electrode and said static or lower electrode, an abnormal detecting program stored in a memory device in said servo-control unit of said electric resistance spot welding gun is executed, said actual clamping force (fi) is compared with said reference clamping force (Fi) in said clamping force vs. electric current table, and, if the absolute value of the difference between said reference clamping force (Fi) and said actual clamping force (fi) is found beyond said predetermined allowance, the abnormal condition is indicated by an alarm output device.

* * * * *